(12) United States Patent
Sherman et al.

(10) Patent No.: US 6,457,080 B1
(45) Date of Patent: Sep. 24, 2002

(54) VIRTUAL BEARER HIGH-SPEED COMMUNICATION CHANNEL-TO-DEVICE INTERFACE

(75) Inventors: Frederick A. Sherman, Mesquite, TX (US); Ranga R. Dendi, Plano, TX (US); Robert G. Leonard, Plano, TX (US); Daniel Hutton, Black Forest, CO (US); Joseph A. Scivicque, Wylie, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/154,342

(22) Filed: Sep. 16, 1998

(51) Int. Cl.$^7$ .................................. G06F 13/14
(52) U.S. Cl. .................... 710/129; 711/112; 711/114; 370/340
(58) Field of Search ................. 710/129; 711/112, 711/114; 370/340

(56) References Cited

U.S. PATENT DOCUMENTS

| | | | | |
|---|---|---|---|---|
| 5,894,362 A | * | 4/1999 | Onaka et al. | 359/124 |
| 6,108,337 A | * | 8/2000 | Sherman et al. | 370/401 |
| 6,112,276 A | * | 8/2000 | Hunt et al. | 711/112 |
| 6,208,657 B1 | * | 3/2001 | Dendi et al. | 370/401 |
| 6,301,313 B1 | * | 10/2001 | Gevarigiz et al. | 375/340 |

* cited by examiner

Primary Examiner—Jeffrey Gaffin
Assistant Examiner—Abdelmoniem Elamin

(57) ABSTRACT

A system and method by which bearer channels within high-speed communication channels can be directly accessed without completely breaking down the high-speed data communication channel. The present invention provides a flexible approach in which individual bearer channels can be accessed and in which data within an accessed bearer channel can easily be changed.

35 Claims, 8 Drawing Sheets

VIRTUAL BEARER HIGH-SPEED COMMUNICATION CHANNEL-TO-DEVICE INTERFACE

FIELD OF THE INVENTION

This invention generally relates to telecommunications systems and more particularly to virtual bearer high-speed communication channel-to-device interfaces.

BACKGROUND OF THE INVENTION

In telecommunications networks, multiple communication channels, sometimes referred to as "bearer channels" are multiplexed onto high-speed telecommunications channels. For example, a number of 64 kilobit per second ("kbps") channels, which may have a DS0 format, can be multiplexed onto a single T1 span. Multiple T1s may, in turn, be multiplexed onto an OC3/STS-3 high-speed optical communications channel.

The STS format is the basic building block of SONET optical interfaces, where STS stands for "Synchronous Transport Signal." The basic SONET building block is the STS-1 signal, which has a rate of 51.84 Mbps. STS consists of two parts, the STS payload and the STS overhead. The STS payload carries information, whereas the STS overhead carries the signaling and protocol information. The STS overhead allows communication between intelligent nodes on the network, permitting administration, surveillance, provisioning and control of a network from a central location.

By using this high-speed multiplexing scheme, very high-bandwidth data communication channels, such as fiber-optic communication channels, may be used effectively for carrying vast quantities of data over great distances. The disadvantage of this approach is that once these many data communication channels are multiplexed onto a single high-speed communication channel, it has been difficult to access and process the original bearer channels contained within the high-speed data communication channel. For example, there may be instances where processing of the single bearer channel carried on an OC3 data communication channel is desired by an application such as a Voice Response Unit ("VRU").

In the past, when the processing of individual data communication channels or voice channels has been desired (within an OC3 high-speed communication channel or the like), an Add-Drop Multiplexer ("ADM") or a series of them have been provided to break down the high-speed communication channel into its constituent bearer channels. These bearer channels can then be connected to the application of interest. The connections to the applications through the bearer channels are configured in a relatively fixed fashion, as the connections are formed by programming the ADM to permanently or semi-permanently connect a certain bearer channel to a certain application.

SUMMARY OF THE INVENTION

The present invention provides a system and method by which sub-signals, sometimes specifically known as bearer channels, within communication signals can be directly accessed without completely breaking down the communication signal into its constituent parts. Furthermore, the present invention provides a flexible approach whereby individual bearer channels can be accessed and whereby the particular bearer channel accessed can be easily changed.

An embodiment of the invention allows applications to interface with SONET transmission devices and distribute all the data elements from a SONET signal to a bus structure. This bus structure makes the data elements available to applications requiring this data. Also provided is the ability to insert data back to the original timeslot or other timeslots on the bus structure. Data that is not required by applications on this device will be passed to other applications or to the output side of the application-to-device interface. The device interface can restructure the data into a SONET structure for transmission to another like device either locally or remotely, giving other like or unlike applications access to the SONET data in the same manner. This interface will synchronize on the header contained, for example, in a standard SONET STS-1 signal or other higher-level signal to start or restart a data sorting process which will distribute the data at the DS0 level or another lower level to a bus structure in a defined manner. The bus structure could be thirty-two 8 MHz data streams, or it could be another bus architecture. Particularly, the bus structure might be adapted for the specific speed of the high-speed communications channel to which this interfacing is desired.

In one embodiment, for example, the system can be reconfigured under control of a telecommunications resource manager, which would preferably control to which application a particular bearer channel might be connected. For example, if a caller would make a call to a certain phone number, and if that call was contained within a high-speed communications channel, a resource manager would preferably be able to connect applications directly to that caller's bearer channel.

By reducing or eliminating the necessity for ADMs, large bandwidth, high-speed, communications signals can be implemented in a wider range of applications. This increase in flexibility to use such large signals comes from being able to connect an application directly to bearer channels, which are the sub-signals within the larger bandwidth communication signal. By this improvement, telecommunications service providers can reduce the cabling that has been necessary to access individual bearer channels through ADMs and can also reduce the number of telecommunications equipment racks at network interface points and other points. With these improvements, the overall costs of interfacing to a high-speed telecommunications network are much reduced.

DETAILED DESCRIPTION OF EMBODIMENTS

Figure 1:
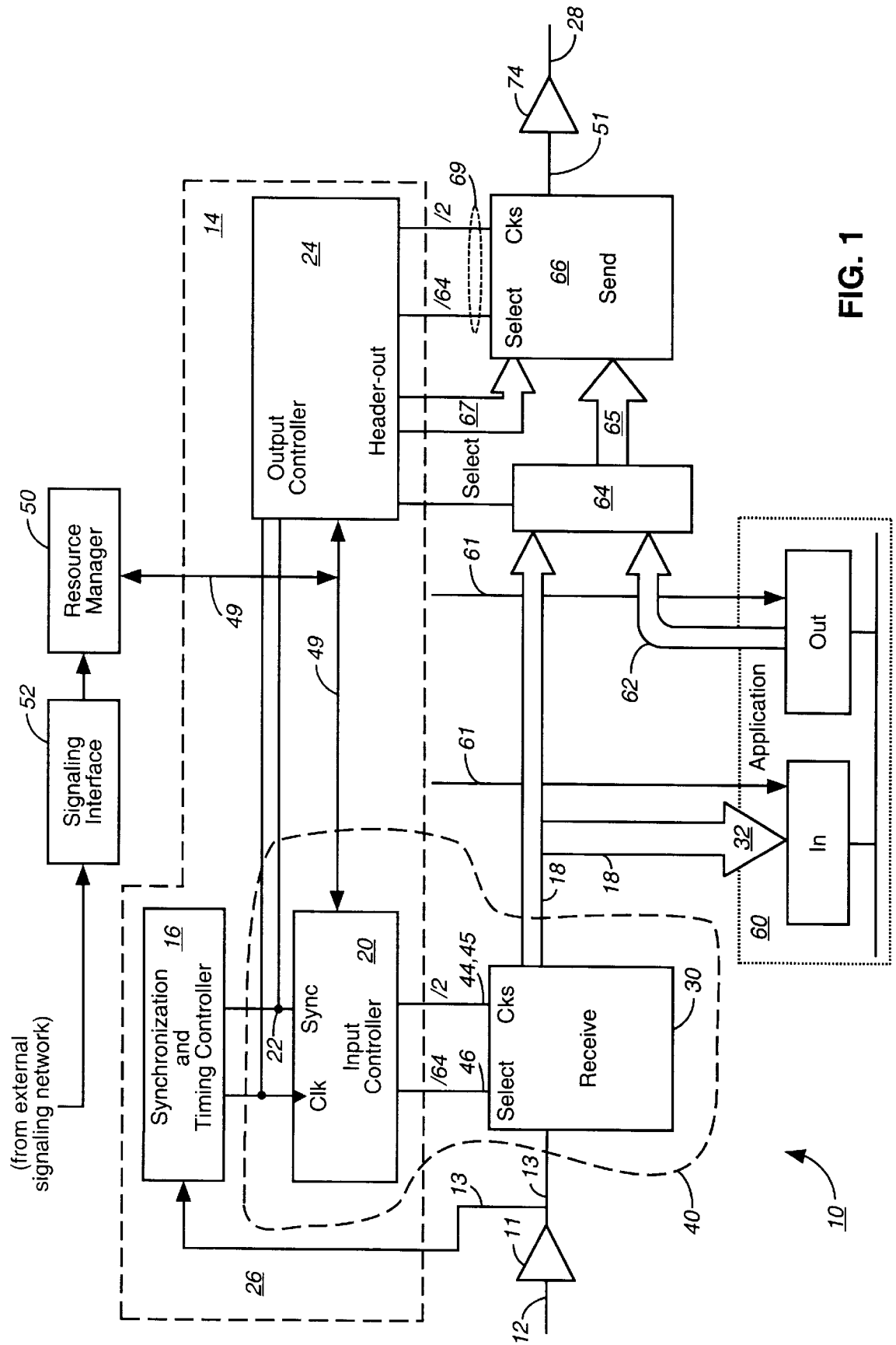
FIG. 1 is a block diagram of an embodiment of the virtual bearer channel-to-device interface.

Referring now to FIG. 1, a virtual bearer high-speed communications channel-to-device interface 10 is shown. The high-speed communications signal 12 input to this device interface 10 in one embodiment is a SONET signal coming in at, preferably, 155.52 MHz. The format of the exemplary input signal 12 is STS-3. The signal is preferably an optical carrier, such as the OC3 optical carrier. A signal-conditioning circuit or buffer 11 may be provided at the input to the device 10 to properly condition the incoming high-speed communications signal 12 to be operated upon by the device 10, thereby providing a conditioned high-speed communications signal 13.

Still referring to FIG. 1, a synchronization and timing circuit 14 is provided which comprises a synchronization and timing controller 14. When the synchronization and timing controller 16 receives synchronization and timing characters that indicate the start of a frame period, the controller 16 sends a "sync" signal 22 to the input controller 20 and the output controller 24. The synchronization and timing controller 16 also operates to extract a clock signal 26 from the received high-speed telecommunications signal 12, and provide that clock signal 26 to the input and output controllers 20, 24.

The synchronization and timing circuit 14 is connected to the incoming data stream 13 in a parallel fashion; in other words, there is a connection that is tapped onto the conditioned high-speed communications signal 13 without substantially interfering with the passage of that signal. The synchronization and timing circuit 14 monitors the incoming data stream for the sync patterns, but does not otherwise affect the incoming data stream. The synchronization information is provided to the input control circuit 20, which controls when and where the data is loaded into the various registers (not shown, see FIG. 4) within the receive circuit 30. The synchronization information used by the synchronization and timing circuit 14 is generally not necessary, not passed on, and not broken down for use by the applications 60 connected to the application bus 18. Thus, the input control circuit 20 will be synchronized to the incoming communications signal, and will preferably only place the data signals (and not the synchronization and timing information) onto the application bus 18. These data signals may also include lower-level synchronization information associated with, for instance, the bearer channels; this information will be transmitted upon the application bus 18 like the rest of the bearer channel data.

Although the higher-level synchronization and control signals are not placed on the application bus 18, they are preferably preserved to be transmitted on to the output control circuit (or output controller) 24. The output controller 24, in turn, can use the synchronization and control signals to reassemble data from application bus 18 back into an outgoing data stream 51, which can be conditioned by the output signal conditioning circuit 74, the output of which is the output high-speed communications signal 28.

The input and output controllers 20, 24, generally operate under control of a higher-level functional element in the communications system such as a resource manager 50. The resource manager will provide information or addressing signals to enable the controllers 20, 24 to correctly make data accessible to applications 60 connected to the device interface 10. At a still-higher level, the resource manager 50 is connected to the external signaling network through a signaling interface 52, which allows the device interface 10 to be controlled by higher-level functional elements in the communications system.

Figure 2:
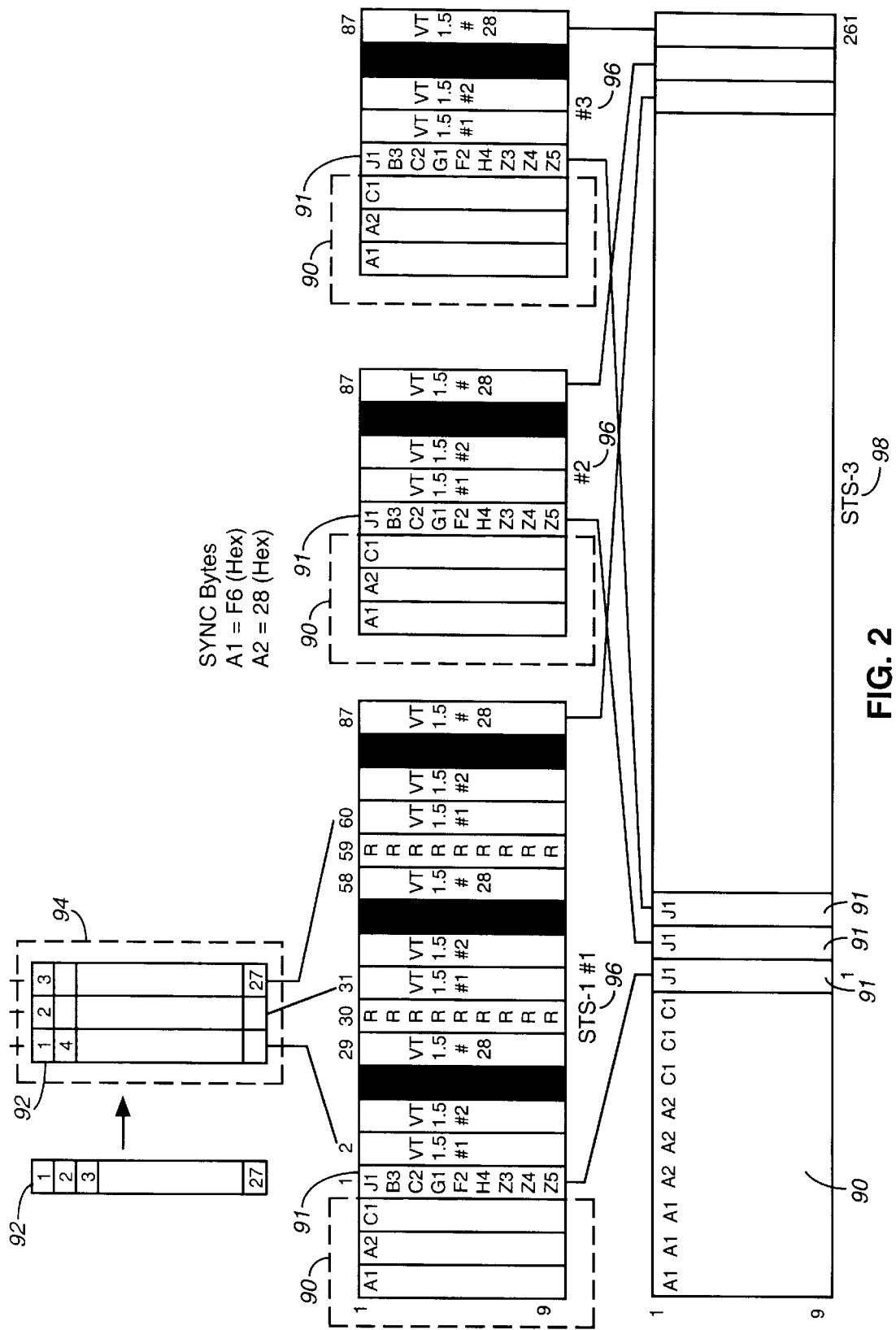
FIG. 2 is a diagram illustrating the data transmission format of an STS-3 signal, which may be processed as the input and output of an embodiment of the present invention such as illustrated in FIG. 1.

The STS-3 signal format is shown in FIG. 2. Each STS-1 signal preferably has transport overhead information 90 and path overhead information 91. This information is located at the beginning of each STS-1 frame 96, and is also located at the beginning of the STS-3 frame 98 that contains these STS-1 frames 96.

Figure 8:
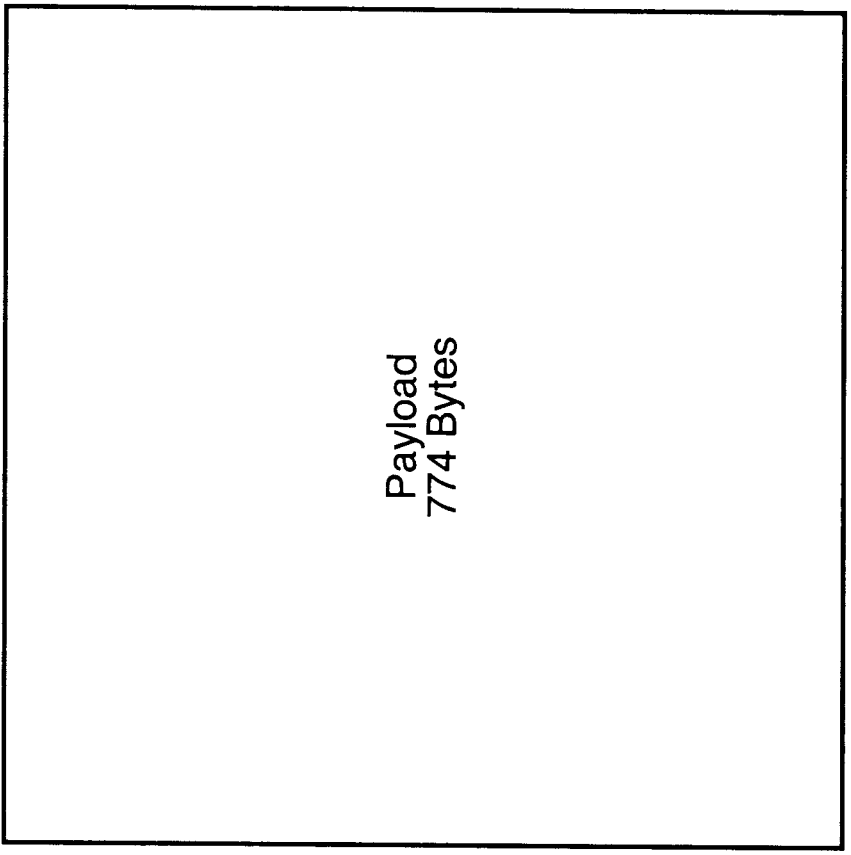
FIG. 8 is a block diagram of an STS-1 frame.

The transport overhead information 90 and path overhead information 91 are shown in greater detail in FIG. 8. In order for the device interface 10 and other network equipment to synchronize to the incoming high-speed communications signal 12, synchronization information is provided in the first two bytes or octets of the transport overhead information 90. These two bytes are shown as "A1" and "A2," and in preferred embodiment the A1 byte has a hexadecimal value of F6 and the A2 byte has a hexadecimal value of 28. The synchronization and timing circuit 14 can look for this framing information in the incoming high-speed communications signal and thereby generate, for instance, a "sync" pulse 22 to the input controller 20 and the output controller 24, and can additionally send the "sync" pulse and/or other control information to the applications 60 through the applications control buses 61. The next set of characters within the STS-1 frame 96 comprises the path overhead information 91. The specific meaning and use of the transport information 90 and path overhead information 91 are in no way limiting of the invention. A specific example of the uses for such character and an explanation of the nomenclature used in this particular embodiment are set forth in ANSI Standard T1.105.

Breaking a frame down from STS-3 to STS-1 to VT1.5, and then looking at any one cell, each cell comprises a DS0 Channel 92, which is also known as a bearer channel. Data and/or voice may be transmitted on such a DS0 channel. Each VT1.5 signal comprises 27 cells, which is preferably broken down into three-by-nine or 27 octet frames 94. Each frame 94 is broken into three nine-octet columns, one of which is contained in the first third of an STS-1 frame (which in the example shown is the #2 position within the STS-1 frame), a second of which is contained within a second third of an STS-1 frame (which in the example shown is the #31 position within the STS-1 frame, and a third of which is contained within the final third of an STS-1 frame (which in the example shown is the #60 position within the STS-1 frame).

Still referring to FIG. 2, as the VT1.5 frames were interleaved into thirds of the STS-1 frames, the STS-1 frames are interleaved into the STS-3 frame. In the STS-1 to STS-3 interleaving, the corresponding bytes of each of the three interleaved STS-1 frames are consecutively transmitted. For example, the first byte of each of the STS-1 #1 frame, the STS-1 #2 frame, and the STS-1 #3 frame are consecutively transmitted in the STS-3 frame 98. This pattern will continue all the way until the $87^{th}$ nine-octet group of each of the STS-1 #1, STS-1 #2, and STS-1 #3 frames have all been transmitted to form the $259^{th}$, $260^{th}$, and $261^{st}$ byte-size elements of the STS-3 frame. As can be seen by FIG. 2, these $259^{th}$, $260^{th}$, and $261^{st}$ elements correspond to the column numbers of the first row of the STS-3 frame, which are transmitted serially from left to right (column #1 to column #261), one row after another (row #1 to row #9). In total, each STS-3 signal 98 comprises 3 STS-1 signals 96, which in turn each comprise 28 VT1.5 signals 94, which in turn each comprises 24 DS0's or bearer channels 92. Within each particular VT1.5 frame 94, the first byte is used for VT path overhead, the second byte is reserved, the third byte is used for signaling and framing, and bytes 4 to 27 comprise the 24 bearer channels or DS0's within the VT1.5. Accordingly, each STS-3 frame comprises 28×24×3 or 2016 bearer channels 92 and 28×3×3 or 252 overhead octets. The data rate of such STS-3 signal (including the three bytes of overhead in each STS-1 frame) is 150.366 Mb/s, and the frame rate of such signal is 125 microseconds or 8000 frames per second.

The timing and synchronization characters tell the device 10 to start the timing process (i.e., to synchronize the timing). The timing process is used from this point to initialize the interface 10, initialize the synchronization & timing circuit 14, and set up the way the high-speed telecommunications signal (preferably a SONET signal) 12 is to be distributed to the application bus 18 by the input controller 20.

The STS-3 format input signal 12 is merely used for illustration purposes. Other format and speed communications signals will fall within the scope of the claims. The scope of the invention is determined by the claims themselves, and the invention should not be limited to particular embodiments described in the patent specification.

Figure 3:
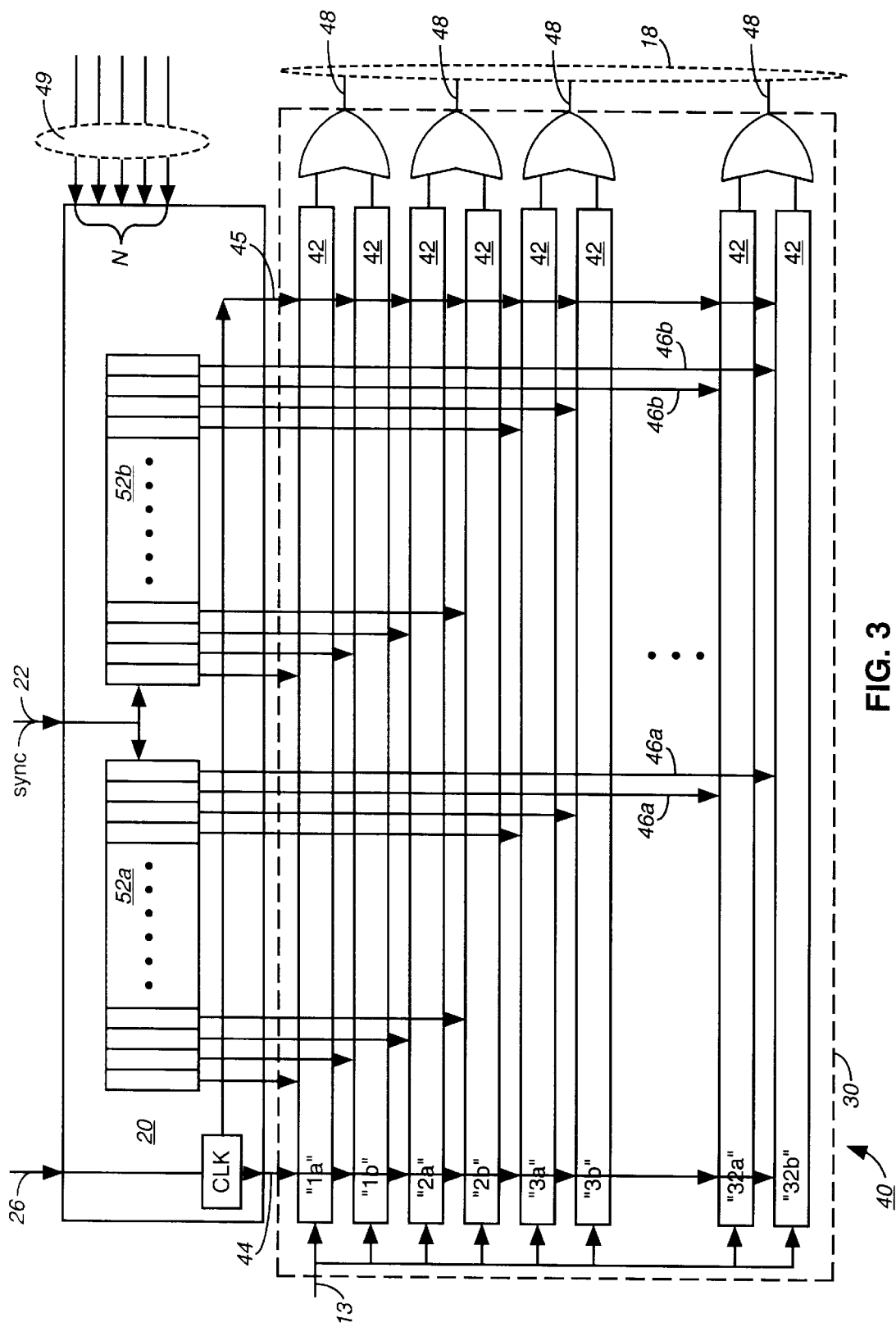
FIG. 3 is a more detailed block diagram of the receive portion of a preferred embodiment virtual bearer SONET-to-device interface.

FIG. 3 is a more detailed block diagram of the input control circuit (or function) 40, which is comprised of the input controller 20 and the receive circuit 30. In this figure, there are shown 32 pairs of 8-bit registers 42. The high-speed communications signal 12, which is preferably a conditioned signal 13 that has been conditioned by the conditioning circuit 11, is fed into the serial inputs of each of these registers 42. In an alternative embodiment, the high-speed communications signal 12 is of a format that is compatible with the inputs to the registers 42, so no signal conditioning would be necessary. An input clock signal 44, which may be the same as the clock signal 26, derived from clock signal 26, or generated separately, is passed on to the registers 42. An output clock signal 45 is also provided, which preferably operates at 8 MHz, which is used to clock information out of the registers 42 and onto the applications bus 18. Additionally, one or more of the input select lines 46 are provided to selectively enable clocking of data into the registers 42, and output select lines 46b are provided to selectively enable clocking of data out of the registers 42.

In a preferred embodiment, the input clock signal 44 operates at 155.52 MHz, while the output clock signal 45 operates at 8 MHz. Sixty-four input select lines 46 are provided from the input control circuit 20 to these 64 registers (in 32 pairs of two). These select lines 46a are used to enable the clocking of data into these registers 42 with the input clock 44. The output from each pair of registers 42 is provided to one of the buses 48, which in the preferred embodiment make up the applications bus 18.

Sixty-four output select lines 46b are provided form input control circuit 20 to the registers 42. These select lines 46b are used with the output clock 45 to enable the clocking of data onto the associated bus lines 48.

The registers 42 are arranged in pairs, so one register 42 may be loaded while the contents of the other register 42 is output onto their associated bus 48. To illustrate the pairings that are established in the system, in FIG. 3, 32 pairs of registers are identified; the first register 42 of each pair is designated as "a" and the second register 42 is designated as "b". The registers 42 are thus numbered as 1a, 1b, 2a, 2b, . . . 32a, 32b.

The reason for the use of these pairs of registers is to provide flexibility to reorder data placed on the 32 buses 48 relative to the data's formatting when received as an STS-3-formatted or otherwise formatted signal. In other words, if data from each register were immediately output as soon the register became filled with data, it would not be possible to reorder the data. The data would, in other words, be "First In, First Out" or "FIFO." In such circumstance, no more than 32 single registers 42 would be required, because there would be time to output the just-received data while the other 31 registers were being filled with data. But if it became necessary or desired, for example, to output consecutive octets on the same 8 MHz bus, a second register 42 is required so the second octet can be loaded while the first is being output onto the 8 MHz bus. Thus, by pairing the registers 42 on each individual bus 48, the device interface is able to reorder the output data from the incoming data stream. Without this pairing, every 32nd octet would have to be placed on a particular bus 48 (i.e., bus #1 would receive the first octet, bus #2 would receive the second octet, and so forth).

Not only does the reordering of the data onto the 32 eight MHz buses 48 (collectively, applications bus 18) allow flexibility in interfacing to applications 60, but this reordering ability further enables interfaces to applications having between 1 and 32 buses for this particular example. In other words, the connected application may require data on a 16-wide bus (i.e. an applications bus 18 having sixteen individual buses 48). From a data capacity standpoint, this would not generally be a problem, since such applications 60 would generally not be operating upon all data being carried by the high-speed communications signal 12. It would be important, on the other hand, that the data be properly formatted such that the bearer channels of interest to the particular application all be placed on one of the data bus lines 48 that are interfaced to the application 60. Although this embodiment has been described for bus widths between one and thirty-two, the same principles apply for design of applications interfaces for higher-speed communications signals (or even lower-speed communications signals) being broken into more data buses than 32 wide. For example, in a system where the applications bus 18 would normally be 64 wide, the received data could be formatted so the bearer channels of interest are all placed on a bus of a width between 1 and 64.

The input controller 20 is operable to receive commands from higher-level functional elements in the communications network and to thereby determine how data received from the high-speed communications signal 12 shall be distributed upon the application bus 18. This function might be accomplished according to certain protocols implemented by a micro-controller within the input controller 20, or preferably by implementing a memory in the input controller that is loaded therein by the high-level function elements in the communications network, such as a communications network Resource Manager 50 (not shown, see FIG. 1). For example, in the preferred embodiment, the input controller 20 might include two 2430×64 memories 52a, 52b. In this embodiment, the memory 52 has 2430 rows because there are 2430 cells in an OC3 frame including the transport overhead information 90-therefore a set of selection signals must repeat for every 2430 cells that are received. There are 64 columns in this example because the incoming high-speed signal 12 is divided into 32 lower-speed buses, which are each handled by a pair of registers 42 (32×2=64 registers=64 selection lines at one per register). Two memories 52a, 52b are preferably provided so that both input and output select lines 46a, 46b can be provided to the registers 42.

Using the clock signal 26 and the sync signal 22, the 64 outputs of the memory 52 can be used to synchronize the select lines 46 into the registers 42. For illustration purposes, the data, which could be stored in memory 52 to cycle in sequential order through the registers 42, is shown below. The simple sequential passing of data from the high-speed communications signal 12 would put the first byte of the incoming stream on the first 8 MHz bus 48, the second byte on the second 8 MHz bus, the third byte on the third bus 48, etc. The memory contents would be as follows:

| 64 | 63 | 62 | 61 | 60–6 | 5 | 4 | 3 | 2 | 1 |
|---|---|---|---|---|---|---|---|---|---|
| 0 | 0 | 0 | 0 | ... | 0 | 0 | 0 | 0 | 1 |
| 0 | 0 | 0 | 0 | ... | 0 | 0 | 1 | 0 | 0 |
| 0 | 0 | 0 | 0 | ... | 1 | 0 | 0 | 0 | 0 |
| . | | | | ... | . | | | | |
| . | | | | | . | | | | |
| 0 | 0 | 0 | 1 | ... | 0 | 0 | 0 | 0 | 0 |
| 0 | 1 | 0 | 0 | ... | 0 | 0 | 0 | 0 | 0 |
| . | | | | ... | . | | | | |
| . | | | | | . | | | | |
| 0 | 0 | 0 | 0 | ... | 0 | 0 | 0 | 1 | 0 |
| 0 | 0 | 0 | 0 | ... | 0 | 1 | 0 | 0 | 0 |
| . | | | | ... | . | | | | |
| . | | | | | . | | | | |
| 0 | 0 | 1 | 0 | ... | 0 | 0 | 0 | 0 | 0 |
| 1 | 0 | 0 | 0 | ... | 0 | 0 | 0 | 0 | 0 |

It can be seen from the above table that the selected line corresponding to the column in the above memory will be whichever column in a certain row has the content of "1." The output of the memory array will be cycled through by row, one row at a time, with each cycle of the clock signal 26, and will begin at the topmost row each time a "sync" signal 22 is received. In this example, the selected column does not increase from column one to column two to column three, etc. Instead, the selected column cycles through all of the odd column numbers up to 63 and then through all of the even column numbers up to column 64. This is because the selected registers 42 are in pairs. If there were only a single register 42 per bus 48 were used, then there would be only 32 columns in this example, and the selected column would proceed sequentially from 1 to 32.

In another embodiment, a single row in the above 64 column memory might have multiple columns selected (i.e., with a "1" stored in them). This capacity might be used for "bridging" or "conferencing" in which voice or data information can be placed from the incoming high-speed data communications signal onto multiple bearer channels. For every location to which this information is "fanned out" on the data bus, for example, the voice signal from a single "talker" can be heard by a listener. There may also be utility in using this technique at the output side of the device interface.

As mentioned, the above example is made to illustrate the use of a memory 52 as the register 42 selection mechanism. This example above, illustrated the situation when the control lines are applied to the registers 42 in a manner such that data were transmitted sequentially on the applications bus 18 in the same order received. In the preferred embodiment, the selections can be made at will by storing more flexible data patterns in the memory 52 for column selection. In this manner, data can be flexibly distributed on the application bus 18.

This following abbreviated table shows a reordering of the input data, where the data from the 2a register is output (or input depending on whether the memory is 52a or 52b) immediately after the data from the 1a register and the data from the 1b register is output after the data from the 2b register.

| 64 | 63 | 62 | 61 | 60–6 | 5 | 4 | 3 | 2 | 1 |
|---|---|---|---|---|---|---|---|---|---|
| 0 | 0 | 0 | 0 | ... | 0 | 0 | 0 | 0 | 1 |
| 0 | 0 | 0 | 0 | | 0 | 0 | 1 | 0 | 0 |
| 0 | 0 | 0 | 0 | | 0 | 0 | 0 | 1 | 0 |
| 0 | 0 | 0 | 0 | | 0 | 1 | 0 | 0 | 0 |
| . | | | | | . | | | | |
| . | | | | | . | | | | |
| . | | | | | . | | | | |

In the preferred case, since a number of data streams are being transmitted, as opposed to discrete blocks of data, the selection pattern will continue and be repeated with each new incoming frame of high-speed communications data. Thus, in a preferred embodiment, the memory may be comprised of a circular structure in which when the most significant address in the memory is accessed, the sequencing returns again to the least significant address in memory and the cycle is repeated.

Once the incoming data has been placed on the applications bus 18 (made up of the lower-speed, e.g., 8 MHz, buses 48), it can be processed by applications 60 directly, as shown in FIG. 1. Such applications 60 can, in turn, place data on outgoing 8 MHz data streams 62, and therefore depending on whether an application has control of the data, a selection circuit 64 may be provided in FIG. 1 that will either select data coming from the receive circuit 30 or from the application 60. At the output of the device interface 10, there is provided a send circuit 66, which is preferably operable to reassemble the data streams 48 or 62 back into an outgoing, OC3 SONET data stream 28. Like at the input, signal-conditioning circuitry 74 may be provided at the output of the device interface 10 for this purpose.

The send circuit 66 preferably reassembles the data in the same order it is received on the application bus 18. Since in the receive circuit 30, the incoming OC3 data could be reordered as desired, it is generally not necessary for the send circuit (or process within a software program) 66 to reorder the data stream. To achieve even greater flexibility, however, the send circuit 66 can operate in a similar manner to the receive circuit 30. In other words, the send process 66 could have 32 pairs of eight-bit registers, which would operate in a manner that would be similar to the registers 42 of the input circuit 30 the input process. The simpler embodiment would be to sequence through one register at a time in sequential order, without allowing for another round of reordering of the information. As previously mentioned, the synchronization and timing information is preferably preserved so that the output controller 24 can properly reassemble the information from the applications bus 18.

Thus, in the send process, the data from the applications bus 18 or application out-going data streams 62 is combined with information such as header information at the send circuit 66. The data is appropriately timed and synchronized by the output controller 24, and the header information is also added thereby. Referring now to FIG. 1, and specifically to the application block 60, the application connected to the application bus might, for example, be a Voice Response Unit ("VRU"). A VRU application is an application commonly encountered when one calls to the main number of the business and is given key-press options whereby the VRU application processes the call according to such key presses.

Such VRU applications typically implement a number of telephony-based functions, such as the recording of voice messages, the playback of recorded messages, and the processing of DTMF tones. An advantage of the present application is that it allows for an application such as the VRU to be inserted directly into the high-speed communications signal 12 (such as an STS-3 signal) and operate directly on a bearer channel within it. This direct insertion allows the application 60 to be much more flexibly configured to operate on one or more bearer channels as if the application were connected through a series of Add-Drop Multiplexers ("ADMs").

External signaling, which is communicated to the applications interface 10 through higher-level functionality such as a resource manager 50, determines that there is to be a certain DS0 located in a specific cell in the STS-3 frame. Each DS0 represents a bearer channel. The operations of a resource manager and external signaling networks can be further understood by reference to commonly-assigned and copending U.S. patent application Ser. Nos. 09/003,977, 09/004,153, 09/004,157, which are hereby incorporated by reference herein. Through the synchronization and timing circuit 14 and the external signaling network, the locations of DS0 cells within particular frames are known. This information is provided to the application 60, which in the preferred embodiment is the VRU application 60. This information is preferably provided over the external signaling network.

The device interface 10 of this application may stand alone or may be a part of a Resource Manager/protocol converter. The high-speed communications channel may be OC3, OC12, OC48, OC192, or other generally high data bandwidth communications channels, transmitted optically or through other communications media. The constituent parts of the high-speed communications channel, or the high-speed communications channels themselves may be, for example: DS1 signals consisting of 24 voice signals and one framing bit per frame and having a rate of 1.544 Mbps; E1/CEPT-1 signals consisting of 30 voice signals and 2 channels for framing and signaling and having a rate of 2.048 Mbps; or some mix of the two. VT1.5 signals generally correspond with DS1 format signals whereas VT2 signals generally correspond with E1/CEPT-1 signals. Interleaving of signals or data can be bit interleaving, byte interleaving, multiple-byte interleaving, frame interleaving, or other interleaving schemes.

Figure 4:
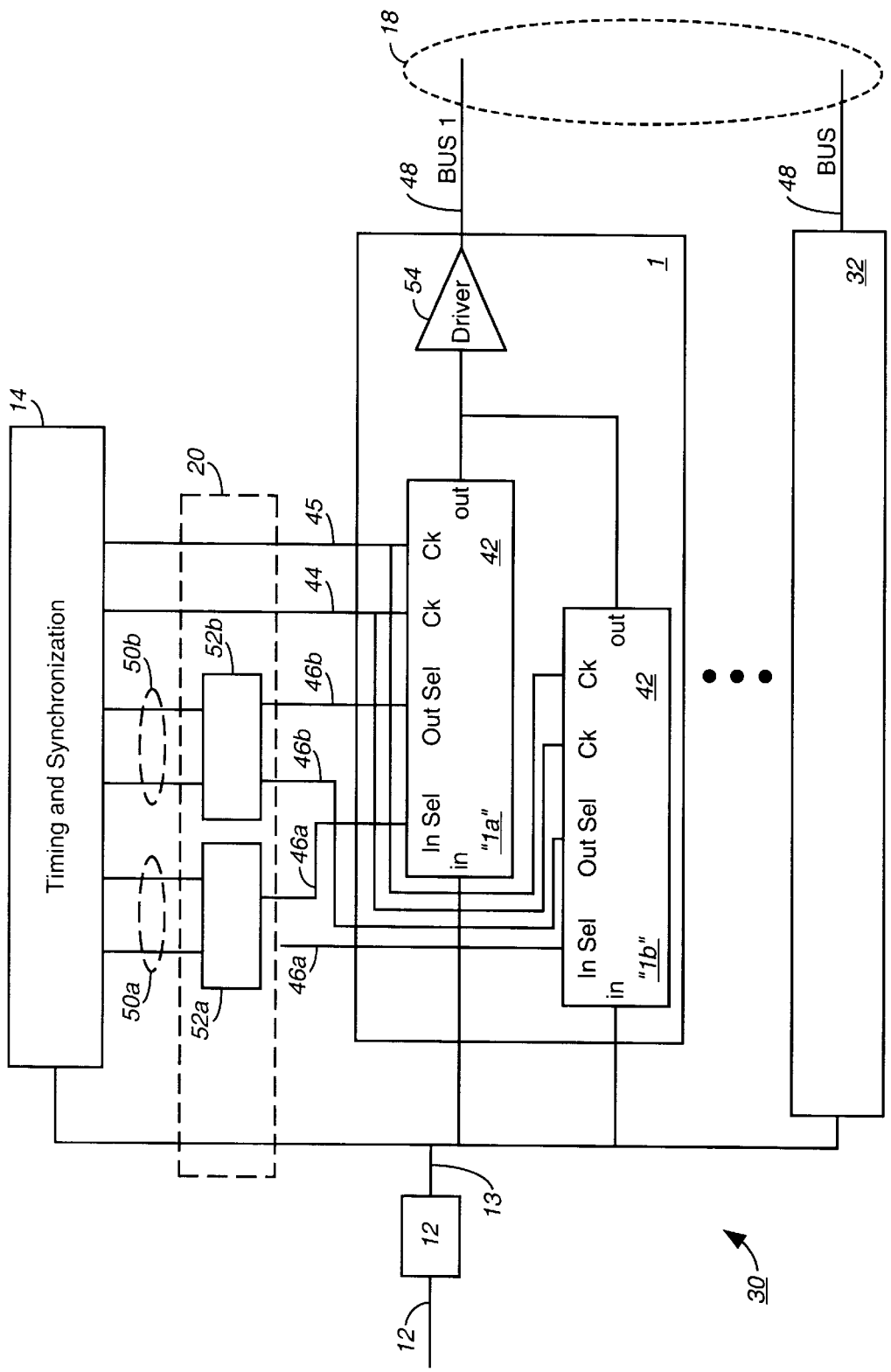
FIG. 4 is another more detailed block diagram of the receive portion of a preferred embodiment virtual bearer channel-to-device interface.

Referring now to FIG. 4, another more detailed embodiment of the receive circuit 30 is provided. The high-speed communications signal 12 is received and in one embodiment is conditioned by the signal conditioning circuit 11. Once conditioned, the signal is passed on the synchronization and timing circuit 14, which as before operates to provide clock signals 44, 45 to registers 42, which operate as input buffers 42. The input clock 44 signal to the registers 42 preferably has the same period as the bit rate of the incoming high-speed communications signal 12, while the output clock 45 signal to the registers 42 preferably has the same period as the bit rate of the individual buses 48 of the applications bus 18.

Still referring to FIG. 4, in this embodiment separate memories 52 are provided to simultaneously control both the input select 46a to the register 42 and the output select 46b to the register 42. In this manner, the clocking into and out of the registers 42 can be flexibly controlled. The control memories 52 in this embodiment are large enough to be stored with rows full of zeros (i.e., no register 42 at all would be selected) during those periods in which the signaling within the high-speed communications signal is received. The registers 42 are arranged in pairs, with each receiving the conditioned high-speed communications signal, but only operating on that signal when selected by the input controller comprised in this embodiment of the memories 52. The outputs of the registers in this instance are connected in a wired-or fashion, just before being received by a bus driver 54. Alternatively, the signals could be connected through an OR gate and then further transmitted onto the applications bus 18 with or without further conditioning depending on the output characteristics of the OR gate and the electrical characteristics of the applications bus 18.

Figure 5:
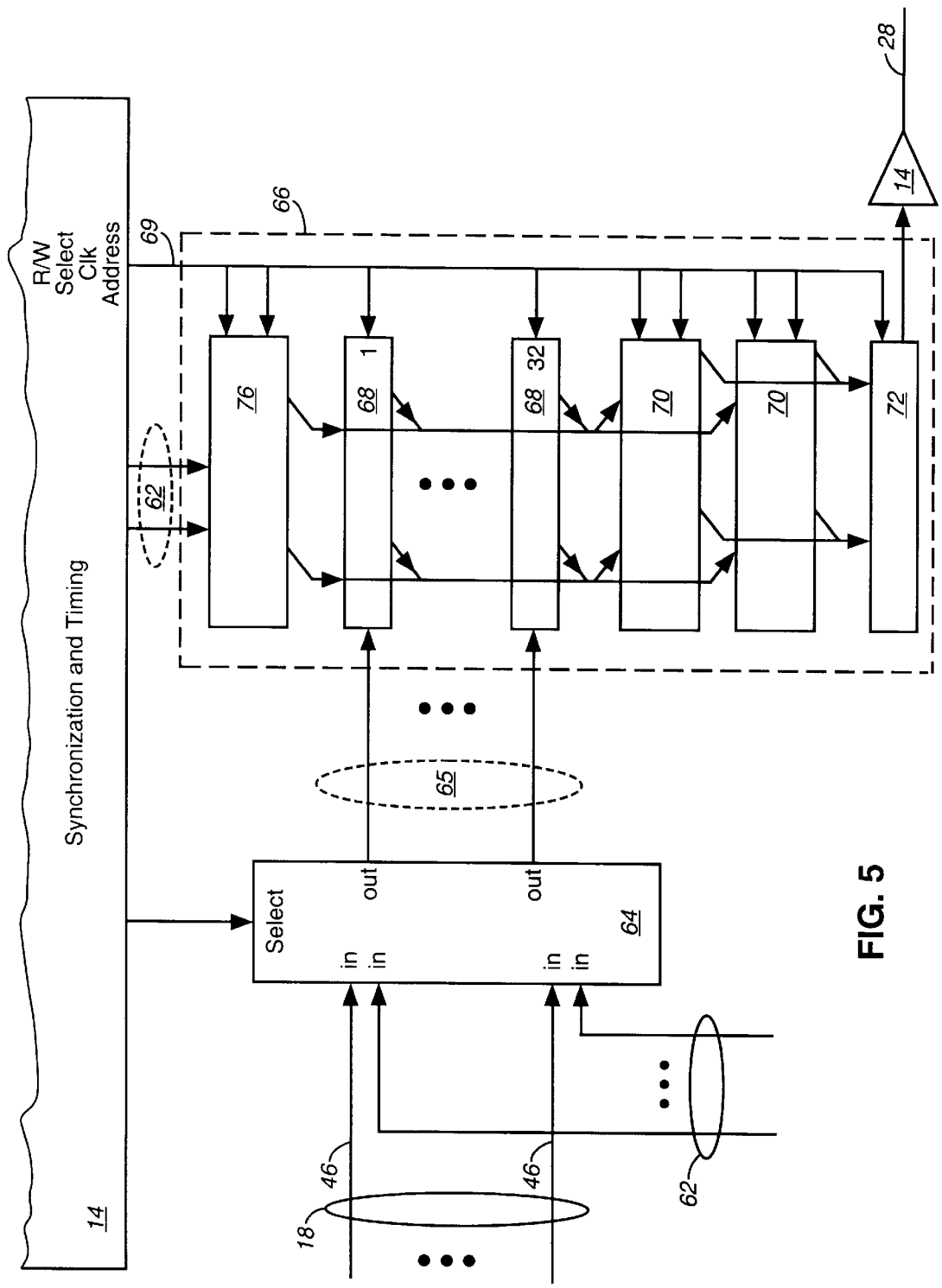
FIG. 5 is a more detailed block diagram of the send portion of a preferred embodiment virtual bearer channel-to-device interface.

Referring now to FIG. 5, the send circuitry 66 and its associated circuitry is described in greater detail. A multiplexer 64 is provided to select between the data from the application bus 18 and the output data 62 from the application 60. In this way, the interface circuit 10 can flexibly select between passing on signals operated upon by the application 60 or just passing the incoming application bus 18 signals straight through. Even in the instance where the application 60 has not taken control of and operated upon the data on the application bus 18, the interface circuit 10 is still operable to reorder the data through flexible ordering of data in the receive circuit 30, if such operation is desired.

Still referring to FIG. 5, the output data from the multiplexer 64 is received by the send circuit 66. The send circuit 66 is preferably comprised of a bank of buffers 68, one for each individual bus that has been selected by the multiplexer 64. The buffers 68 are preferably serial-to-parallel converters, which receive a serial bit stream, as from a bus, and output the received data in a parallel fashion. The selection of the buffers is preferably accomplished according to signals 69 received from the synchronization and timing circuit 14. Preferably, the buffers have eight parallel outputs, which are loaded out according to the select lines 69 into output buffers 70, which may be selectively accessed to load the data in them into an output high-speed communications signal buffer 72, from whence the high-speed communication signal output may be conditioned by the output signal conditioning circuit 74, to form an output high-speed communications signal 28. Also provided in the send circuit 66 is another buffer 76 ("header buffer") for the header information for the output high-speed communications signal 28. Information is preferably loaded in this header buffer 76 from the synchronization and timing circuit 14, whereby such information can also be clocked out of this buffer into the output buffers 72 and from there into the output high-speed communications signal buffer 76.

As mentioned, synchronization is provided through the timing and synchronization circuit 14 to reassemble the synchronization and to rebuild the high-speed communications output signal 28 data stream. On this send circuit 66, single buffers or registers 68 are preferably provided for each of the individual buses 48 on the switched application bus. At this stage, the headers can be computed and re-inserted into the ongoing data stream. As an alternate embodiment, these registers 68 may be paired for each incoming bus, and selection signals may be provided for each of these registers 68 whereby the data coming in can be flexibly reordered in the same manner as was the incoming data. To control such flexible rearrangement of data, memories could be provided as the selectors for the buffers 68 as was done on the receive side process or circuit 30.

To increase the capacity of the device interface, one can either increase the number of buses 48 comprised in the applications bus 18, or increase the speed of the buses, or both. For example, to handle an OC12 signal, which carries approximately four times the data and control of an OC3 signal, the capacity of the device interface 10 must be increased fourfold. This could be done, for example, by using 128 rather than 32 buses, or 32 MHz buses rather than 8 MHz buses, or by using 64 buses operating at 16 MHz each.

Figure 6:
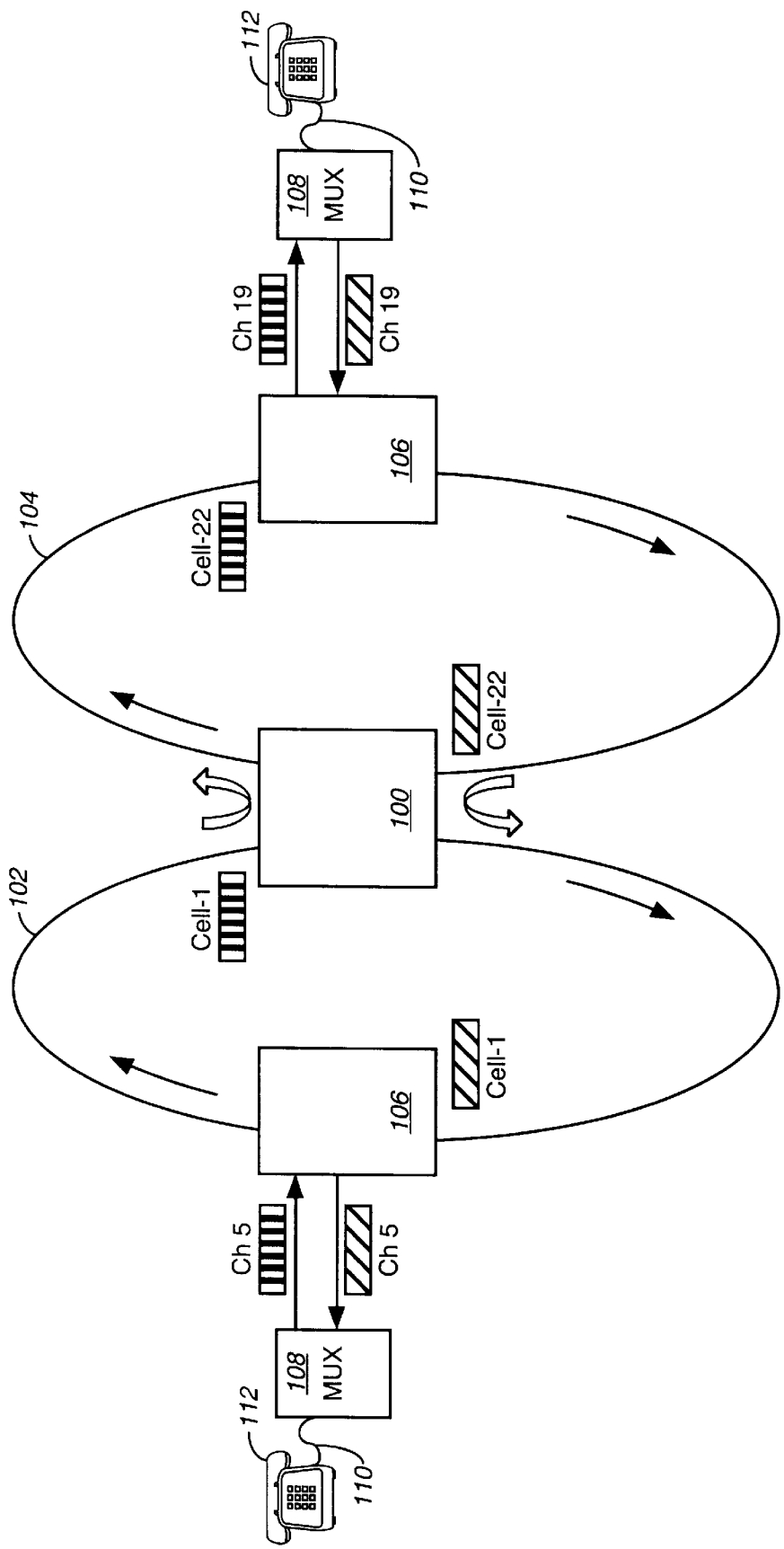
FIG. 6 is a block diagram of an application of an embodiment of the invention wherein the virtual bearer channel-to-device interface is used to interface two ring networks.

Referring now to FIG. 6, the application 60 connected through the device interface 10 can be a ring-to-ring interface 100 located between the two SONET OC3 rings 102, 104. As such, on one side the inbound process could receive data from one OC3 ring 102, formatting it to be placed on another OC3 ring 104, while the outbound process can receive data from the other OC3 ring 104, placing the data on the first OC3 102 ring in the correct position.

Figure 7:
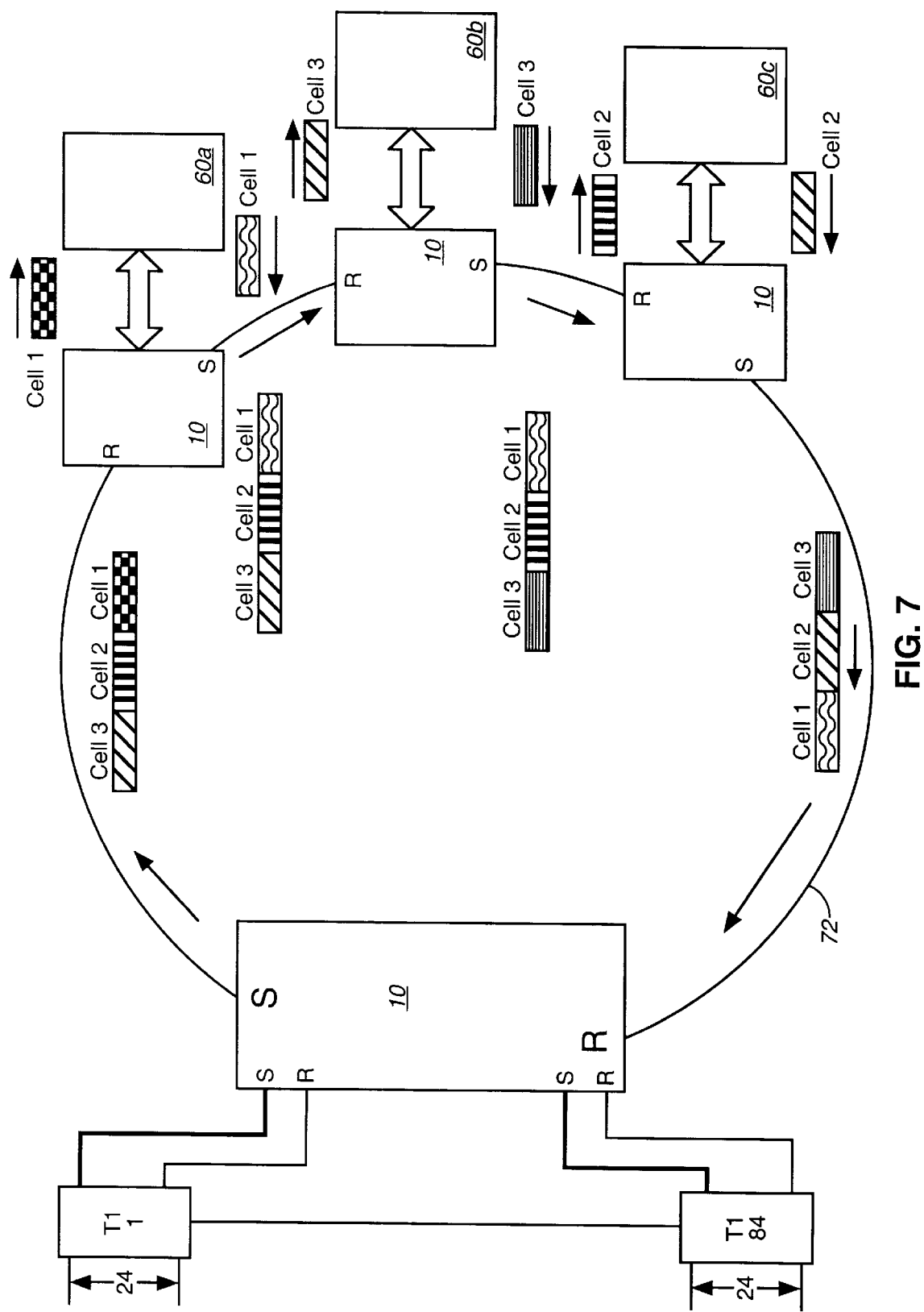
FIG. 7 is a block diagram of an application of an embodiment of the invention showing multiple virtual bearer channel-to-device interfaces on a ring network.

Referring to FIG. 7, an advantage of the present invention is that it allows an application 60 to freely acquire data from any virtual bearer channel it desires. This is an advantage over conventional ADM-type interfaces, in which the application will be constrained by the particular channel routed to it through the ADM. This advantage allows, for instance, a number of applications 60a, 60b, 60c to be connected on a ring network 72 for performing various telecommunications processes 60. Through the external signaling network (not shown) or by another internal signaling network, if it is sensed that one of the applications (e.g., application 60a) has failed, a new application (e.g., application 60b) can be flexibly configured to take over the processing functions that were dropped by the failing application. The device interface 10 is especially useful for this, because it easily allows data to be switched through the interface without modification under command, preferably, of higher-order functionality in the system, such as a telecommunications system resource manager. This switching may be provided within the device interface 10, for example, by multiplexer 64.

Still referring to FIG. 7, data can be brought into the ring network from another ring network in the telecommunications system, through what appears on the ring network 72 as another application. For example, the application 60a may be a "1-800-Collect" application executing on an operator services platform. As the name implies, a "1-800-Collect" application processes collect calls made through a network for receiving, routing, and processing calls that are to be billed to the called party. The types of functions that could be used on such a ring network 72 with this process could be a "call parking" function 60b, a "conference bridging" function 60c, and a data "bridging" function 60d.

The application 60a also would receive data from the ring 72 as a part of its incoming data, pass this data on to another network (such as another ring network), or reorder the information to be routed to a different application 60b–c within the ring network. If the information is routed to a different network or application, it will be removed from the data stream by the application 60a. The application is also operable to receive data from external to the ring 72 and place this data onto the ring network 72. Many other applications can be used as a part of and with the systems and methods described and claimed in this patent application.

A few preferred embodiments have been described in detail hereinabove. It is to be understood that the scope of the invention also comprehends embodiments different from those described, yet within the scope of the claims. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Particular embodiments of this invention can be carried out in software, firmware, or hardware. Hardware designs could be carried out, for example, through a custom-designed interface chipset. The switching performed in various embodiments can be electrical or optical switching, or another type of switching technology. The 32×8 MHz bus structure could be a CT bus, or it could be another bus structure.

What is claimed is:

1. An application interface operable to receive an incoming communications signal having a plurality of sub-signals, and to make data available to an application connected to said application interface, said application interface comprising:
   a) a communications signal input;
   b) a plurality of data buses; and
   c) a circuit connected to said communications signal input and to said plurality of data buses, said circuit being operable to parse data from said incoming communications signal and to distribute said data among said plurality of data buses, whereby said application may selectively access said data from said plurality of sub-signals.

2. The application interface of claim 1 wherein said selective access is a receipt of data from said plurality of sub-signals.

3. The application interface of claim 2 wherein said selective access further comprises a transmission of data to said plurality of sub-signals.

4. The application interface of claim 3 wherein said circuit is further operable to transmit said received data from one of said plurality of sub-signals upon at least two of the others of said plurality of sub-signals.

5. The application interface of claim 1 wherein said circuit comprises an input control circuit and a receive circuit, and wherein said input control circuit is connected to said receive circuit through input control lines, whereby said receive circuit flexibly distributes data among said plurality of data buses under the control of said control circuit.

6. The application interface of claim 5 and further comprising a plurality of input buffers corresponding to said plurality of data buses, said input buffers operable to store data received from said communications signal.

7. The application interface of claim 6 wherein said input control circuit comprises a data memory with a plurality of outputs wherein at least one of said plurality of outputs is operable to selectively load at least one of said input buffers with said data from said communications signal.

8. The application interface of claim 6 wherein said input control circuit comprises a data memory with a plurality of outputs wherein at least one of said plurality of outputs is operable to selectively unload said data from said communications signal upon one of said plurality of data buses.

9. The application interface of claim 7 wherein said data memory is operable to be addressed by a communications resource manager whereby data can be stored in said memory to determine the format of the parsing of data from said communications signal upon said plurality of data buses.

10. The application interface of claim 5 and further comprising a timing circuit connected to said communications signal input and to said receive circuit, said timing circuit operable to extract timing information from said incoming communications signal and provide synchronization information to said receive circuit.

11. The application interface of claim 10 wherein said timing circuit provides said synchronization n information to said receive circuit via said control circuit.

12. The application interface of claim 11 wherein said control circuit modifies said synchronization information before passing it through to said receive circuit.

13. The application interface of claim 1 and further comprising a send circuit, said send circuit operable to combine data from said plurality of data buses and to combine it onto a single, outgoing communications signal.

14. The application interface of claim 13 and further comprising an output control circuit connected to said send circuit through output control lines.

15. The application interface of claim 14, further comprising a timing circuit connected to said output control circuit, whereby said output control circuit is operable to receive synchronization information from said timing circuit.

16. The application interface of claim 15 and further comprising a plurality of application bus inputs for receiving data from an application external to said application interface, said application interface further comprising an application bus multiplexer connected at its inputs to said plurality of data buses and to said plurality of application bus inputs and connected at its outputs to said send circuit, said application bus multiplexer operable to select to transmit either data carried by said plurality of data buses or said plurality of application bus inputs to said send circuit according to a select signal receiving from said timing circuit.

17. An application interface operable to receive an incoming communications signal having a plurality of sub-signals, and to make data available to an application connected to said application interface, said application interface comprising:
   a) a communications signal input;
   b) a synchronization circuit having an input connected to said communications signal input and a synchronization output, said synchronization circuit being operable to receive said incoming communications signal and to provide synchronization information at said synchronization output;
   c) a receive circuit connected to said communications signal input and said synchronization output, said receive circuit having a plurality of data bus outputs and being operable to receive said communications signal input and to parse at least a portion of the data from said communications signal input onto a plurality of said data bus outputs; and
   d) an applications data bus comprising a plurality of data buses which are connected individually to the data bus outputs of said receive circuit.

18. The application interface of claim 17 and further comprising a send circuit, said send circuit operable to combine data from said plurality of data buses onto a single, outgoing high-speed communications channel.

19. The application interface of claim 18 and further comprising an output control circuit connected to said send circuit through output control lines.

20. A method for accessing bearer channels within a communications signal, the method comprising the steps of:
   a) receiving a communications signal comprising a plurality of sub-signals;
   b) parsing data from said communications signal upon a plurality of data buses according to instructions from a communications resource manager; and
   c) receiving at least one of said plurality of data buses in a connected application whereby said application is operable to process data from said at least one of said sub-signals.

21. The method of claim 20 and further comprising the step of clocking, at a first frequency, data from said communications signal into a plurality of input buffers associated with said plurality of data buses.

22. The method of claim 21 and further comprising the step of clocking, at a second frequency, data from said input buffers onto said plurality of data buses.

23. The method of claim 22 wherein said first frequency is different from said second frequency.

24. The method of claim 22 wherein a first portion of said data from said communications signal is received at a first time and wherein a second portion of said data from said communications signal is received at a second time that is after said first time, and wherein said second portion is placed on one of said plurality of data buses prior to said first portion being placed on one of said plurality of data buses.

25. A communication network operable to connect a plurality of applications, the communication network comprising:
   a first application interface operable to receive an first incoming communications signal from said communication network, said first incoming communication signal having a plurality of sub-signals, said first application interface having:
      a synchronization circuit for receiving said incoming communications signal and being operable to provide synchronization information at said synchronization output;
      a receive circuit connected to said synchronization circuit and having a plurality of data bus outputs and being operable to receive said communications signal and to parse at least a portion of the data from said communications signal input onto a plurality of said data bus outputs, and
      an applications data bus comprising a plurality of data buses which are connected individually to the data bus outputs of said receive circuit;
   a second application interface operable to receive a second incoming communications signal from said communication network, said second communication signal having a plurality of sub-signals, said application interface having:
      a synchronization circuit for receiving said incoming communications signal and being operable to provide synchronization information at said synchronization output;
      a receive circuit connected to said synchronization circuit and having a plurality of data bus outputs and being operable to receive said communications signal and to parse at least a portion of the data from said communications signal input onto a plurality of said data bus outputs, and
      an applications data bus comprising a plurality of data buses which are connected individually to the data bus outputs of said receive circuit.

26. The communications network of claim 25 wherein said first and second application interfaces are connected through a single ring network.

27. The communications network of claim 25 wherein the second incoming communications signal is output from said first application interface.

28. The communications network of claim 25 wherein said first application interface is on a first ring network and said second application interface is on a second ring network and wherein each of first and second application interfaces is connected to the other by said applications data buses of at least one of said first and second application interfaces.

29. The communications network of claim 28 wherein data is exchanged between said first ring network and said second ring network through said first and second application interfaces.

30. The communications network of claim 25 wherein at least one of said applications is operable to receive and place calls that will be billed to the called party.

31. The communications network of claim 25 wherein at least one of said applications is a call parking application.

32. The communications network of claim 25 wherein at least one of said applications is operable to bridge data from one incoming communications signal to a plurality of outgoing communications signals.

33. The communications network of claim 32 wherein said data carries digitized voice signals.

34. An application interface, comprising:
   a plurality of data buses;
   a circuit operable to parse data from an incoming communications signal having a plurality of sub-signals and operable to distribute said data onto said plurality of data buses, whereby an application may selectively access said data from said plurality of sub-signals;
   a send circuit operable to combine data from said plurality of data buses onto a single outgoing communications signal;
   a plurality of application bus inputs for receiving data from an application external to said application interface; and
   an application bus multiplexer operable to select to transmit to said send circuit one of data carried by said plurality of data buses and data carried by said plurality of application bus inputs.

35. A method for accessing sub-signals within a communications signal, comprising the steps of:
   parsing data from a communications signal having a plurality of sub-signals onto a plurality of data buses; and
   receiving at least one of said plurality of data buses by an application operable to process data from at least one of said sub-signals;
   wherein a first portion of said data from said communications signal is received at a first time, a second portion of said data from said communications signal is received at a second time that is after said first time, and said second portion is placed on one of said plurality of data buses prior to said first portion being placed on one of said plurality of data buses.

* * * * *